United States Patent
Fujii et al.

(10) Patent No.: US 7,081,317 B2
(45) Date of Patent: Jul. 25, 2006

(54) POLYMER ELECTROLYTE THIN FILM FUEL CELL AND METHOD OF OPERATING THE SAME

(75) Inventors: Satoru Fujii, Takatsuki (JP); Kazuhito Hatoh, Osaka (JP); Masato Hosaka, Osaka (JP); Kohji Yuasa, Chigasaki (JP); Yasutaka Noguchi, Ikoma (JP); Satoshi Shibutani, Hirakata (JP); Aoi Tanaka, Osaka (JP); Nobuhiko Hojo, Neyagawa (JP); Yukihiro Okada, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 188 days.

(21) Appl. No.: 10/297,850

(22) PCT Filed: Mar. 26, 2002

(86) PCT No.: PCT/JP02/02938

§ 371 (c)(1),
(2), (4) Date: Dec. 11, 2002

(87) PCT Pub. No.: WO02/080299

PCT Pub. Date: Oct. 10, 2002

(65) Prior Publication Data

US 2003/0170520 A1  Sep. 11, 2003

(30) Foreign Application Priority Data

Mar. 29, 2001 (JP) ............................ 2001-96953

(51) Int. Cl.
  H01M 4/90 (2006.01)
  H01M 4/86 (2006.01)
  H01M 8/10 (2006.01)
(52) U.S. Cl. ............................ 429/40; 429/38; 429/23; 429/30; 429/27; 429/32
(58) Field of Classification Search .................. 429/40, 429/38, 23, 30, 27, 32, 44, 34, 12
See application file for complete search history.

(56) References Cited

U.S. PATENT DOCUMENTS 6,183,898 B1 * 2/2001 Koschany et al. ............ 429/42

(Continued)

FOREIGN PATENT DOCUMENTS

JP  8-64216  3/1996

(Continued)

OTHER PUBLICATIONS

Jeffrey D. Morse et al., "Novel proton exchange membrane thin-film fuel cell for microscale energy conversion", J. Vac. Sci. Technol., vol. 18, No. 4, Jul./Aug. 2000, pp. 2003-2004.

(Continued)

Primary Examiner—Patrick Joseph Ryan
Assistant Examiner—Angela J. Martin
(74) Attorney, Agent, or Firm—McDermott Will & Emery LLP (57) ABSTRACT

It is difficult to realize a small fuel cell capable of being installed in mobile device by merely downsizing a conventional fuel cell without changing the configuration. The present invention provides a small fuel cell employing a polymer electrolyte thin film, by using a semiconductor process. A polymer electrolyte thin film fuel cell in accordance with the present invention comprises: a substrate having a plurality of openings; an electrolyte membrane-electrode assembly formed on the substrate so as to cover each of the openings, the assembly comprising a first catalyst electrode layer, a hydrogen ion conductive polymer electrolyte membrane and a second catalyst electrode layer which are formed successively; and fuel and oxidant supply means for supplying a fuel or an oxidant gas to the first catalyst electrode layer through the openings, and an oxidant gas or a fuel to the second catalyst electrode layer.

20 Claims, 6 Drawing Sheets

U.S. PATENT DOCUMENTS

| | | | |
|---|---|---|---|
| 6,475,655 B1* | 11/2002 | Nakanishi et al. | 429/19 |
| 6,673,130 B1* | 1/2004 | Jankowski et al. | 29/623.5 |
| 2003/0082425 A1* | 5/2003 | Leban | 429/32 |
| 2004/0033398 A1* | 2/2004 | Kearl et al. | 429/22 |
| 2004/0076865 A1* | 4/2004 | Breault | 429/30 |

FOREIGN PATENT DOCUMENTS

| | | |
|---|---|---|
| JP | 2000-268836 | 9/2000 |
| JP | 2001-236970 | 8/2001 |
| JP | 2001-351649 | 12/2001 |
| JP | 2002-15763 | 1/2002 |

OTHER PUBLICATIONS

Jeffrey D. Morse et al., "Novel proton exchange membrane thin-film fuel cell for microscale energy conversion", J. Vac. Sci. Technol., vol. 18, No. 4, Jul./Aug. 2000, pp. 2003-2005.

* cited by examiner

POLYMER ELECTROLYTE THIN FILM FUEL CELL AND METHOD OF OPERATING THE SAME

TECHNICAL FIELD

The present invention relates to polymer electrolyte fuel cells intended for such applications as portable electronic information terminal equipment including cellular phones, computers or the like, small electronic medical equipment, or micro-electromechanical components.

BACKGROUND ART

A fuel cell using a polymer electrolyte generates electric power and heat simultaneously by electrochemical reaction of a fuel gas containing hydrogen and an oxidant gas containing oxygen such as air. This fuel cell is basically constructed by a pair of electrodes, namely, an anode and a cathode, formed respectively on both surfaces of a polymer electrolyte membrane that selectively transports hydrogen ions. In general, the above-mentioned electrode comprises a catalyst layer composed mainly of a carbon powder carrying a platinum group metal catalyst, and a diffusion layer which has both gas permeability and electronic conductivity and is formed on the outside surface of this catalyst layer.

In order to prevent leakage of the fuel gas and oxidant gas supplied to the electrodes and prevent mixing of two kinds of gases, gas sealing members or gaskets are arranged on the periphery of the electrodes with the polymer electrolyte membrane disposed therebetween. These sealing members or gaskets are assembled integrally with the electrodes and polymer electrolyte membrane in advance. This part is called "MEA" (electrolyte membrane-electrode assembly). Disposed outside of the MEA are conductive separator plates for mechanically securing the MEA and for electrically connecting adjacent MEAs in series, or in some cases, in parallel. Disposed at portions of the separator plates, which are in contact with the MEA, are gas flow channels for supplying reacting gases to the electrode surfaces and for removing a generated gas and excess gas. Although the gas flow channels can be provided separately from the separator plates, grooves are usually formed on the surfaces of the separator plates to serve as the gas flow channels.

In order to supply the fuel gas and oxidant gas to these grooves, it is necessary to branch pipes that supply the fuel gas and the oxidant gas, respectively, according to the number of separator plates to be used, and to use piping jigs for connecting the ends of the branched pipes directly to the grooves of the separator plates. This jig is called "manifold" and a type of manifold that directly connects the supply pipes of the fuel gas and oxidant gas to the grooves as mentioned above is called "external manifold". There is a type of manifold, called "internal manifold", with a more simple structure. The internal manifold is configured such that through holes are formed in the separator plates having gas flow channels and the inlet and outlet of the gas flow channels are extended to the holes so as to supply the fuel gas and oxidant gas directly from the holes.

Since the fuel cell generates heat during operation, it is necessary to cool the cell with cooling water or the like in order to keep the cell in good temperature conditions. In general, a cooling section for feeding the cooling water is provided for every one to three cells. There are a type in which the cooling section is inserted between the separator plates and a type in which a cooling water flow channel is provided in the back surface of the separator plate so as to serve as the cooling section, and the latter type is often used. The structure of a common cell stack is such that these MEAs, separator plates and cooling sections are placed in an alternate manner to form a stack of 10 to 200 cells, and this stack is sandwiched by end plates, with a current collector plate and an insulating plate disposed between the stack and each end plate, and secured with clamping bolts from both sides.

In a conventional fuel cell configuration as described above, unit cells each comprising an MEA and separator plates sandwiching the MEA are simply stacked in the thickness direction, and a fuel cell having a volume capable of being installed in mobile devices cannot be readily achieved by merely downsizing a conventional fuel cell without changing the configuration. Additionally, it is difficult to supply a fuel or oxidant gas to individual unit cells by simply stacking them in the thickness direction in order to achieve a serial connection. Further, the smaller the thickness and area of the electrode catalyst layer or polymer electrolyte membrane, the more difficult the handleability thereof during manufacturing.

In addition, the output of the fuel cell significantly depends on the surrounding environment such as temperature. Accordingly, it is difficult to install a conventional fuel cell as it stands, in mobile devices. For example, the output of the fuel cell is low at the time of start-up of the fuel cell because of a lower cell temperature compared with that at normal operation, so that it is occasionally impossible to drive a device until the cell temperature rises to a normal operating temperature. This makes it difficult to install the fuel cell in mobile devices.

It is an object of the present invention to provide a small fuel cell which employs a polymer electrolyte membrane and is suitable for use in mobile devices.

It is another object of the present invention to provide a method of manufacturing a fuel cell employing a semiconductor process.

DISCLOSURE OF INVENTION

A polymer electrolyte thin film fuel cell in accordance with the present invention comprises: a substrate having a plurality of openings; and an electrolyte membrane-electrode assembly formed on the substrate so as to cover each of the openings, the assembly comprising a first catalyst electrode layer, a hydrogen ion conductive polymer electrolyte membrane and a second catalyst electrode layer which are formed successively. The above-mentioned electrolyte membrane-electrode assembly is connected in series or parallel. The fuel cell further comprises fuel and oxidant supply means for supplying a fuel or an oxidant gas to the first catalyst electrode layer through the openings, and an oxidant gas or a fuel to the second catalyst electrode layer. When the oxidant gas is air, the catalyst electrode layer on the cathode side may be exposed in air.

The present invention further provides a polymer electrolyte fuel cell comprising a second substrate which comprises a plurality of openings and an electrolyte membrane-electrode assembly formed so as to cover each of the openings, the assembly comprising a first catalyst electrode layer, a hydrogen ion conductive polymer electrolyte membrane and a second catalyst electrode layer which are formed successively, the assembly being connected in series or parallel, wherein the second substrate and the above-mentioned substrate are bonded together with back surfaces thereof facing each other, and a gas flow channel linking the openings is formed between the both substrates.

The first catalyst electrode layer and second catalyst electrode layer are preferably porous.

It is preferable that a hydrogen selective permeable film is laminated on a surface of a catalyst electrode layer to which hydrogen gas is supplied.

It is preferable that the electrolyte membrane constituting the electrolyte membrane-electrode assembly comprises a laminate of a hydrogen ion conductive polymer electrolyte membrane and a water retaining material film.

It is preferable that the electrolyte membrane constituting the electrolyte membrane-electrode assembly comprises a laminate of a hydrogen ion conductive polymer electrolyte membrane and an anti-crossover film.

It is preferable that the electrolyte membrane constituting the electrolyte membrane-electrode assembly comprises a laminate of a hydrogen ion conductive polymer electrolyte membrane and a hydrogen selective permeable film, and the fuel cell comprises fuel supply means for supplying, through the openings of the substrate, a liquid organic fuel to the first electrode catalyst layer.

The present invention provides a polymer electrolyte thin film fuel cell comprising:

a plurality of cell blocks each containing a single or plurality of electrolyte membrane-electrode assemblies;

connecting means for connecting the cell blocks in series or parallel; and controlling means for controlling the connecting means to switch the cell blocks from series to parallel, or from parallel to series.

It is preferable-that the above-described controlling means is operated, in cooperation with voltage detecting means for detecting a voltage of the cell blocks, so as to connect the cell blocks in series when the voltage of the cell blocks is lower than a predetermined value.

Further, the present invention provides a polymer electrolyte thin film fuel cell comprising:

at least two sets of cell blocks each containing a single or plurality of electrolyte membrane-electrode assemblies;

connecting means for connecting the cell blocks in series or parallel;

voltage detecting means for detecting an output voltage of the cell blocks; and controlling means for controlling the connecting means to connect the cell blocks in series when a voltage detected by the voltage detecting means is lower than a predetermined value and for controlling the connecting means to connect the cell blocks in parallel when the voltage is higher than a predetermined value.

The present invention provides a method of manufacturing a polymer electrolyte thin film fuel cell, the method comprising the steps of:

successively forming on a substrate, a first catalyst electrode layer, a hydrogen ion conductive polymer electrolyte membrane and a second catalyst electrode layer, thereby producing an electrolyte membrane-electrode assembly; and forming on a back surface of the substrate at a portion thereof corresponding to the electrolyte membrane-electrode assembly, an opening for exposing the first catalyst electrode layer.

It is preferable that the first or second catalyst electrode layer is formed from an alloy of a metal having catalytic action and a metal having no catalytic action, followed by removing the metal having no catalytic action from the first or second catalyst electrode layer in the step of forming the openings, thereby making the first or second catalyst electrode layer porous.

The present invention further relates to a method of operating a polymer electrolyte thin film fuel cell, comprising the step of filling an acid solution in a gas flow channel or liquid organic fuel channel to replace a cation impurity trapped in the hydrogen ion conductive polymer electrolyte membrane, after operating the above-described polymer electrolyte fuel cell for a certain period of time or when a predetermined output decrease is observed in the fuel cell, thereby removing the impurity from the fuel cell.

BEST MODE FOR CARRYING OUT THE INVENTION

A polymer electrolyte thin film fuel cell in accordance with the present invention comprises a plurality of openings on a substrate and an electrolyte membrane-electrode assembly (MEA) placed on the substrate so as to cover each of the openings, the assembly comprising a first catalyst electrode layer, a hydrogen ion conductive polymer electrolyte membrane and a second catalyst electrode layer which are laminated in this order. Then, the electrolyte membrane-electrode assembly disposed on the substrate is connected in series or parallel.

Further, a method of operating a polymer electrolyte thin film fuel cell in accordance with the present invention comprises the step of filling an acid solution in a gas flow channel or liquid organic fuel channel, after operating the fuel cell for a certain period of time or when a predetermined output decrease is observed in the fuel cell. This also makes it possible to replace impurity ions trapped in the hydrogen ion conductive polymer electrolyte membrane, thereby concurrently removing the impurity ions from the fuel cell. For example, in order to remove cations attributed to water, such as those of Na, Ca or the like, or metal ions such as ions of Fe, Cr, Ni or the like, the hydrogen ion conductive polymer electrolyte membrane may be regenerated with an acid such as $HNO_3$.

In the following, examples of the fuel cell configuration in accordance with the present invention will be described by reference to FIG. 1 to FIG. 10. It should be appreciated that the structural drawings are used herein for the purpose of facilitating understanding and the relative sizes and positional relations of individual components are not necessarily accurate.

Embodiment 1

Figure 1:
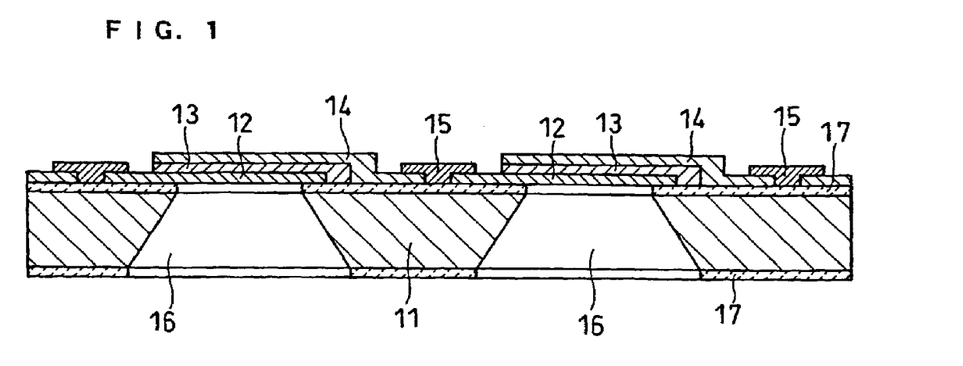
FIG. 1 is a longitudinal sectional view showing a fuel cell of Embodiment 1 in accordance with the present invention.
Figure 2:
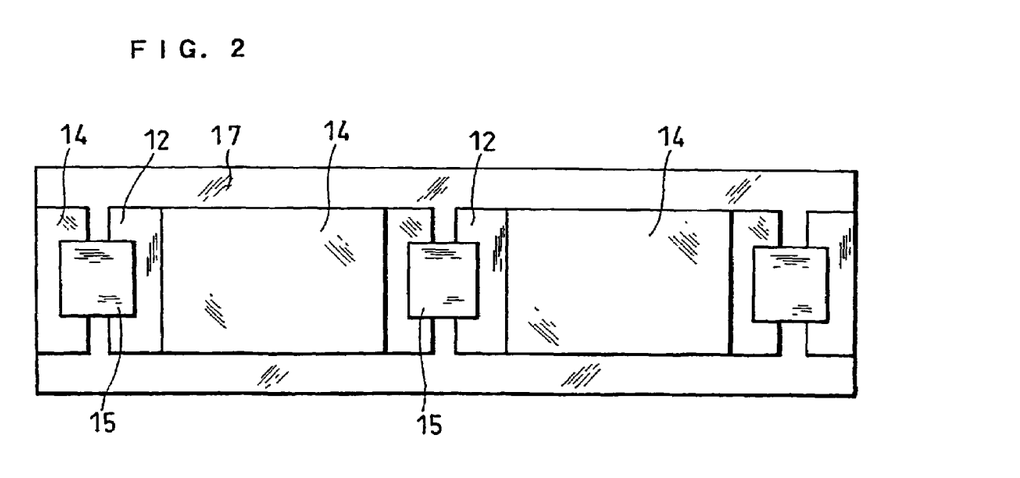
FIG. 2 is a plan view of the same fuel cell.
Figure 3:
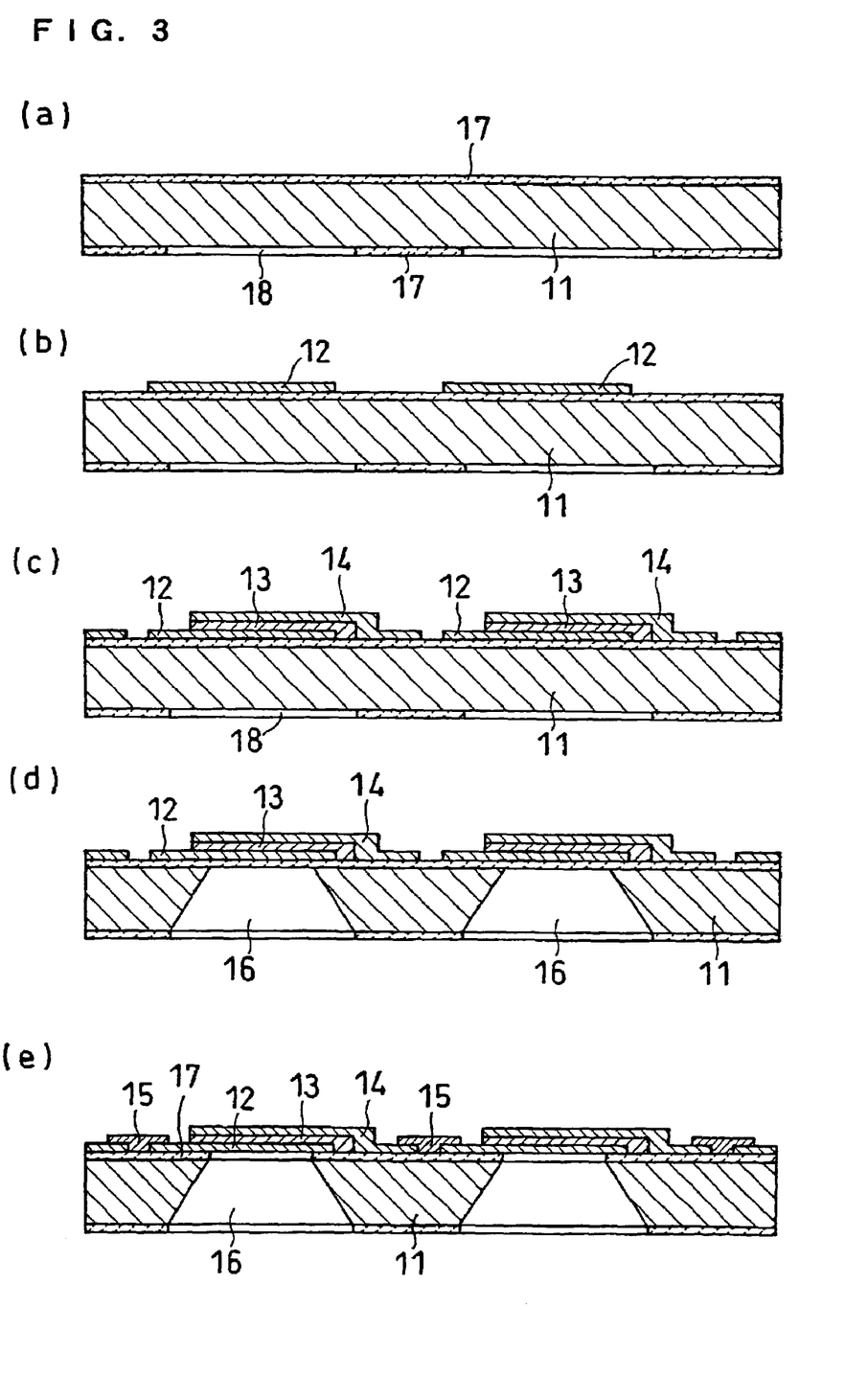
FIG. 3 is a cross-sectional view showing a production process of the same fuel cell.

FIG. 1 is a sectional view showing a polymer electrolyte thin film fuel cell of this embodiment, and FIG. 2 is a plan view of the same cell, taken from the second catalyst electrode layer side. FIG. 3 is a sectional view showing a manufacturing process of the same cell.

In these figures, a numeral 11 denotes a substrate. The substrate 11 has a plurality of openings 16 (i.e., through-holes), and an MEA is formed so as to cover each of the opening. The MEA comprises a laminate of a first catalyst electrode layer 12, a hydrogen ion conductive polymer electrolyte thin membrane 13 and a second catalyst electrode layer 14. The MEA is connected in series or parallel by a connector 15. Disposed outside the substrate are structures (not shown) provided with flow channels for supplying a fuel and an oxidant gas to the first catalyst electrode layer and the second catalyst electrode layer, respectively.

A method of manufacturing the above-mentioned thin film fuel cell will be described by reference to FIG. 3.

As the substrate 11, a Si single crystal substrate cut at the (100) plane is used. On both front and back surfaces of the substrate 11, a silicon nitride film having a thickness of 0.25 μm is formed as a mask layer 17 by a chemical vapor deposition process (FIG. 3(a)). As the raw materials, dichlorosilane and ammonia are employed. The mask layer 17 functions as a protection layer in the step of forming the openings 16 on the substrate 11 by etching. The mask layer on the back surface of the substrate is removed by reactive ion etching at portions thereof where the openings are formed, thereby forming etching holes 18.

Subsequently, the first catalyst electrode layer 12 is formed on the front surface of the substrate by a sputtering process (FIG. 3(b)). In Embodiment 1, the first catalyst electrode layer is used as the anode. The anode comprises a Pt—Ru alloy having a thickness of 0.01 to 0.05 μm. In the formation of the layer, a target comprising a ternary alloy of Pt—Ru—Al is used. This is for the purpose of removing Al by etching after the formation of the openings 16 on the substrate, thereby forming a porous electrode layer having excellent gas diffusion properties. After the formation of the first catalyst electrode layer 12, the hydrogen ion conductive polymer electrolyte thin membrane 13 is formed. As the electrolyte thin membrane 13, a perfluorosulfonic acid polymer is employed. Specifically, a 5% perfluorosulfonic acid solution (Nafion, manufactured by E. I. du Pont de Nemours & Co., Inc.) is spin-coated at 300 rpm for 15 seconds, followed by heat treatment at 135° C. for 30 minutes. Repetition of this operation enables controlling of the thickness of the hydrogen ion conductive polymer electrolyte thin membrane. Herein, the thickness of the electrolyte thin membrane 13 is 0.5 to 5 μm. Thereafter, the second catalyst electrode layer 14, which corresponds to the cathode, is formed by a sputtering process (FIG. 3(c)). The thickness of the layer is 0.01 to 0.05 μm. This layer comprises a Pt thin film; however, it is initially formed as a Pt—Al alloy thin film, and Al is eventually removed therefrom by etching to give a porous thin film having excellent gas diffusion properties.

After the formation of the MEA in the above-described manner, the Si substrate is etched with a 30 to 50 vol % of KOH aqueous solution having been heated to 80° C. to form the openings 16 (FIG. 3(d)). By using the Si single crystal substrate cut at the (100) plane, the (111) plane is preferentially etched. Subsequently, the protection layer 17 on the back surface of the electrode layer 12 is removed by sputter etching. Thereafter, Al in the catalyst electrode layer is removed by etching with the same KOH aqueous solution as described above, thereby producing a porous electrode layer having excellent gas diffusion properties. The protection layer 17 on the back surface of the electrode layer 12 may also be removed by reactive ion etching during the formation of the above-mentioned etching holes 18. This method enables removal of Al in the catalyst electrode layer by etching during the formation of the openings 16.

Finally, in order to connect adjacent cells in series, the connector 15 for connecting the first catalyst electrode layer with the second catalyst electrode layer is formed (FIG. 3(e)). As the connector 15, for example, Cr, Ni, Au or the like is formed into a film having a thickness of 0.05 to 0.3 μm by a sputtering process or vapor deposition process. In this embodiment, individual unit cells are connected in series as shown in the cross-sectional view in FIG. 1. However, it is evident that they can also be connected in parallel.

In this embodiment, the electrode area of the unit cell is 0.01 cm$^2$. A gas flow channel member is provided for supplying hydrogen gas as a fuel gas through the openings 16. The gas flow channel member is produced using a Si single crystal substrate cut at the (100) plane. The second catalyst layer serving as the cathode is not particularly provided with a gas flow channel member or the like, and is opened to the atmosphere so that air can be supplied thereto. While the thin film fuel cell of the present invention having the above-described configuration is held at 75° C., a humidified hydrogen gas is supplied through the openings 16 to the fuel cell; as a result, an open circuit voltage per unit cell of 0.91 V is observed at no load in which no current is output to the outside, yielding an output per unit cell of 0.03 to 0.1 W/cm$^2$. The fuel cell is operable at room temperature and capable of yielding an output which is about one-third to one-tenth of that obtained in the operation at 75° C.

In this embodiment, the first catalyst electrode layer was used as the anode. However, it is evident that the present invention is also effective when the second catalyst electrode layer is used as the anode. Additionally, the sequence of the manufacturing process of the present invention was described as forming the openings 16 after the formation of the MEA. However, it is evident that the present invention is also effective even when this sequence is reversed. Further, the hydrogen ion conductive polymer electrolyte thin membrane was formed by spin coating in the example described above. However, the hydrogen ion conductive polymer electrolyte thin membrane can be formed by a plasma polymerization process or other production processes.

Embodiment 2

Figure 4:
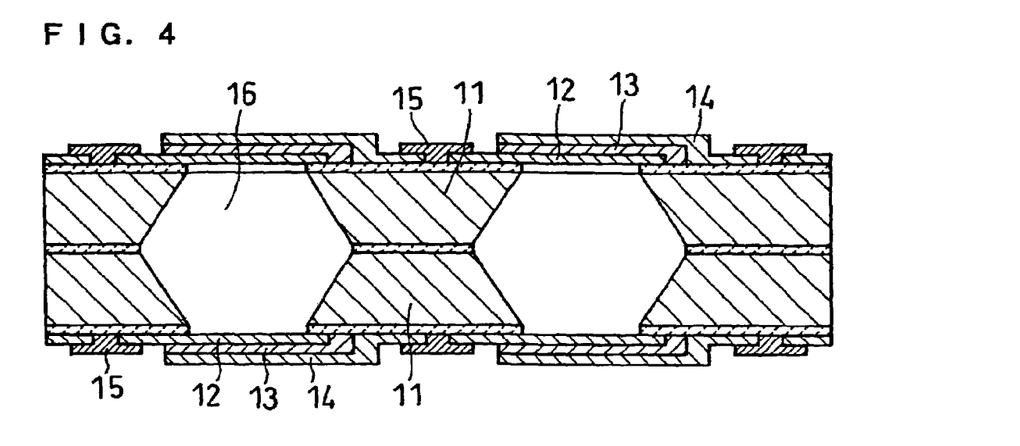
FIG. 4 is a longitudinal sectional view showing a fuel cell of Embodiment 2 in accordance with the present invention.

FIG. 4 shows a longitudinal sectional view of a polymer electrolyte thin film fuel cell of this embodiment. This embodiment differs from Embodiment 1 in that two sheets of substrates 11 are bonded to each other on their surfaces where no MEAs are formed. With this configuration, the integration of twice as many unit cells as those in Embodiment 1 can be readily achieved.

Figure 5:
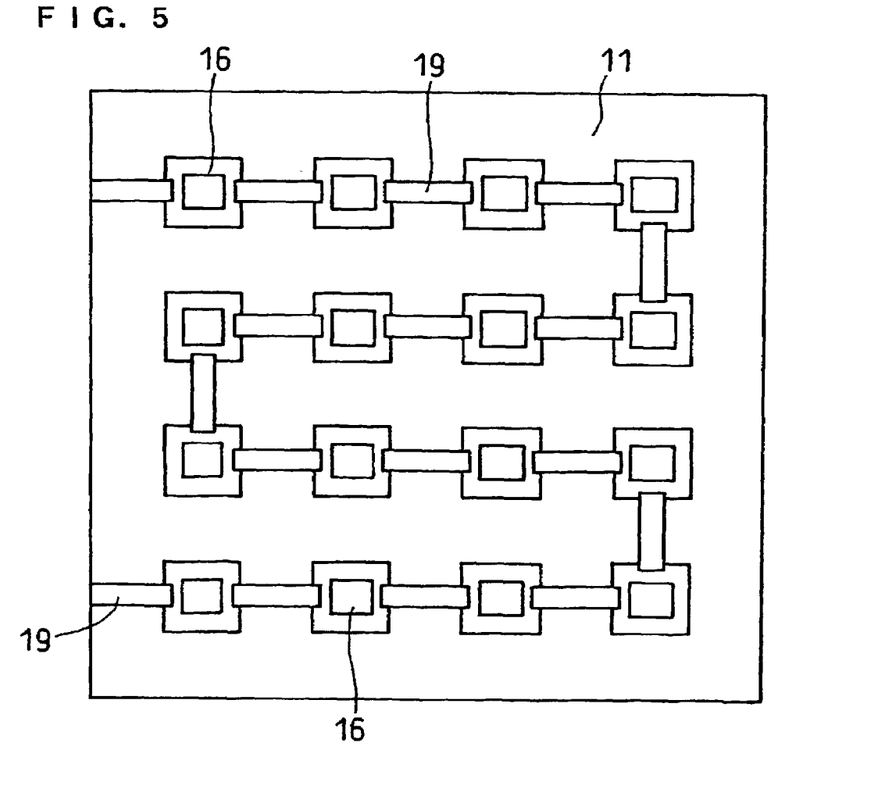
FIG. 5 is a rear view of a substrate of the same fuel cell.

The substrate 11 is provided with a gas flow channel 19 for supplying a fuel gas to all of the cells. FIG. 5 shows a plan view of the substrate, taken from the direction opposite from the MEA.

By applying an anisotropic etching process to a Si single crystal substrate cut at the (100) plane, the gas flow channel 19 having a predetermined width can be formed concurrently with the openings 16. In this example, the gas flow channel linking the openings of individual unit cells is in a serpentine arrangement. However, it is evident that the gas flow channel may be in other arrangements such as a parallel flow arrangement.

Embodiment 3

Figure 6:
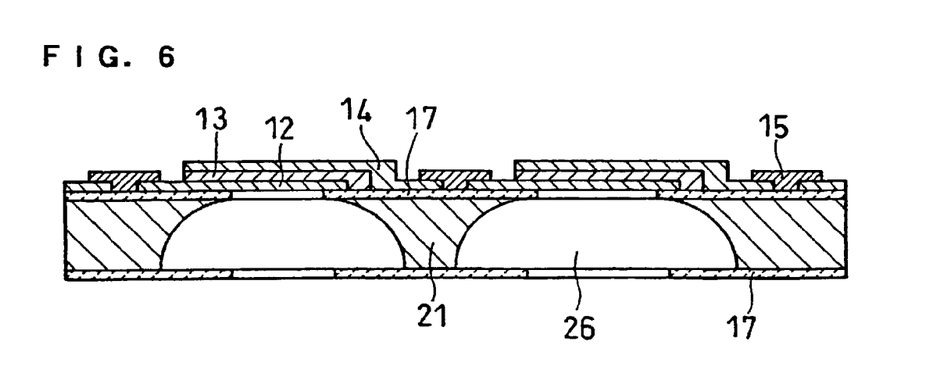
FIG. 6 is a longitudinal sectional view showing a fuel cell of Embodiment 3 in accordance with the present invention.

FIG. 6 shows a longitudinal sectional view of a polymer electrolyte thin film fuel cell of this embodiment. This embodiment differs from Embodiment 1 in that the second catalyst electrode layer is used as the anode and that a different material is used as a substrate 21. As the substrate 21, glass, stainless steel, polyimide film or the like may be used.

For the etching of a glass substrate, a 30 wt % HF aqueous solution at room temperature is employed. In the case of a stainless steel substrate, an iron chloride aqueous solution heated to 60° C. is used. Additionally, in the case of a polyimide film substrate, the etching is performed using a solution of alkali such as KOH to form the openings. It should be noted that, unlike the Si single crystal substrate, the etching performed on the above-described substrates is isotropic etching.

Since various substrate materials such as a glass substrate can be employed, this embodiment is effective to reduce the cost of the fuel cell. Further, a fuel cell having a curved shape or cylindrical shape can be readily produced by using a flexible material such as polyimide film as the substrate 21. Accordingly, this embodiment is effective in terms of small equipment applications.

Embodiment 4

Figure 7:
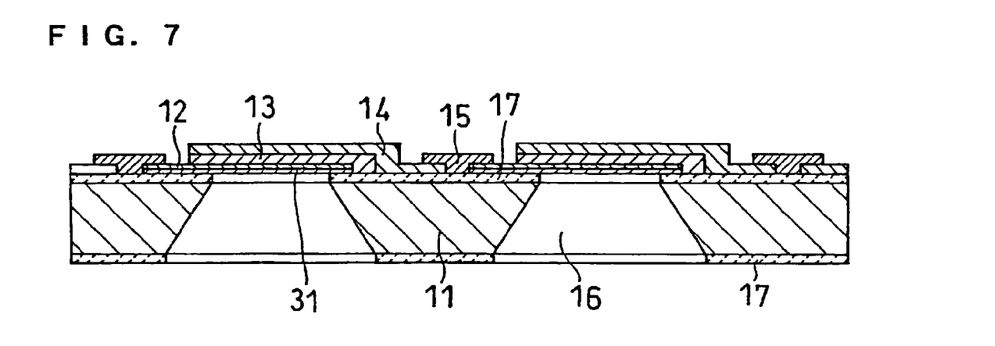
FIG. 7 is a longitudinal sectional view showing a fuel cell of Embodiment 4 in accordance with the present invention.

FIG. 7 shows a longitudinal sectional view of a polymer electrolyte thin film fuel cell of this embodiment. This embodiment differs from Embodiment 1 in that a hydrogen selective permeable film is formed at the anode on the surface thereof to which hydrogen gas is supplied.

A hydrogen selective permeable film 31 is directly formed on the substrate 11. On the hydrogen selective permeable film 31, the first catalyst electrode layer is formed. As the hydrogen selective permeable film 31, a Pd thin film having a thickness of 0.005 to 0.08 μm is formed by a sputtering process or vapor deposition process. Consequently, the absorption of impurities such as CO to the anode can be prevented in the case of using a hydrogen fuel produced by reforming gasoline, natural gas, methanol or the like. Therefore, this embodiment is effective from the viewpoint of durability of the polymer electrolyte thin film fuel cell. As compared with Embodiment 1, the output voltage variation with time is improved by approximately 30%.

Embodiment 5

Figure 8:
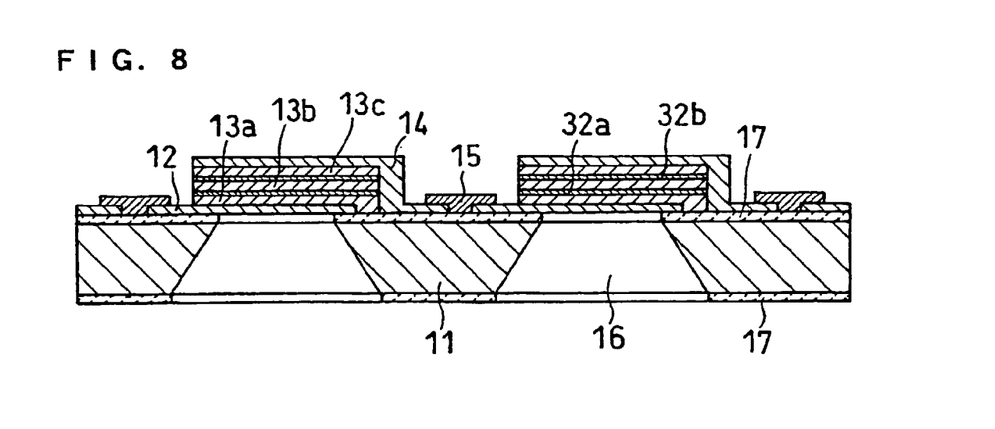
FIG. 8 is a longitudinal sectional view showing a fuel cell of Embodiment 5 in accordance with the present invention.

FIG. 8 shows a longitudinal sectional view of a polymer electrolyte thin film fuel cell of this embodiment. This embodiment differs from Embodiment 1 in that the electrolyte thin membrane constituting the MEA comprises a laminate of a hydrogen ion conductive polymer thin membrane and a water retaining material film.

After the formation of a polymer electrolyte thin membrane 13a on the first catalyst electrode layer 12 by spin coating in the same manner as in Embodiment 1, a water retaining material film 32a is formed. This step is repeated to form a laminate comprising three layers of polymer electrolyte thin membranes 13a, 13b and 13c and two layers of water retaining material films 32a and 32b. For the water retaining material film, an oxide such as silicon dioxide, titanium dioxide or zirconium oxide is employed. For the manufacturing thereof, a sputtering process is employed. The film thickness is 0.01 to 0.08 μm. The water retaining material films 32a and 32b serve the function of absorbing and retaining, in the electrolyte membrane, $H_2O$ produced at the cathode by the fuel cell reaction. The hydrogen ion conductivity of the polymer electrolyte, typified by perfluorosulfonic acid, is greatly influenced by the water content in the polymer membrane. Accordingly, the use of the water retaining material film increases the hydrogen ion conductivity, thereby improving the generation efficiency of the thin film fuel cell. As compared with Embodiment 1, the output of the thin film fuel cell is improved by approximately 10 to 30%.

Embodiment 6

In a polymer electrolyte thin film fuel cell of this embodiment, the electrolyte thin membrane constituting the MEA comprises a laminate of a hydrogen ion conductive polymer electrolyte thin membrane and an anti-crossover film. In other words, anti-crossover films are used in place of the water retaining material films 32a and 32b in FIG. 8.

After the formation of the polymer electrolyte thin membrane on the first electrode catalyst layer 12 by spin coating in the same manner as in Embodiment 1, the anti-crossover film is formed. This step is repeated to produce a laminate comprising three layers of the polymer electrolyte thin membrane and two layers of the anti-crossover film. As the anti-crossover film, a thin film of Pt serving as an electrode catalyst and having a thickness of 5 to 10 nm is used. The film is produced by a sputtering process or vapor deposition process.

Since the thickness of the polymer electrolyte thin membrane is small in the thin film fuel cell of the present invention, there is a possibility that the reaction gases are diffused to react on the opposite electrodes, causing a fear of the performance degradation. Therefore, the anti-crossover film serving as a catalyst material is laminated with the polymer electrolyte thin membrane, and the fuel gas and oxidant gas that have crossed over are reacted on the anti-crossover film to impede them from reacting on the opposite electrodes, thereby preventing a decrease in output. Consequently, the use of the anti-crossover film suppresses the reaction of the reacting gases on the opposite electrodes, improving the generation efficiency of the thin film fuel cell. As compared with Embodiment 1, the output is improved by approximately 5 to 30%.

Further, it is possible to improve the output by approximately another 10 to 25% in this embodiment, by laminating the water retaining material film described in Embodiment 5 with the anti-crossover film to improve the water retention.

Embodiment 7

A polymer electrolyte thin film fuel cell of this embodiment differs from that of Embodiment 1 in that a hydrogen selective permeable film constitutes a laminate with the polymer electrolyte thin membrane. After the formation of the polymer electrolyte thin membrane on the first electrode catalyst layer 12 by spin coating in the same manner as in Embodiment 1, a Pd thin film serving as a hydrogen selective permeable film and having thickness of 0.01 to 0.05 μm, is formed by a sputtering process or vapor deposition process. This step is repeated to produce a laminate of three layers of the polymer electrolyte thin membrane and two layers of the hydrogen selective permeable film.

Unlike Embodiments 1 to 6, a liquid organic fuel such as methanol is used as a fuel in this embodiment. Accordingly, the problem to be solved is the crossover of the liquid organic fuel to the opposite electrode. Therefore, this embodiment is effective in that the crossover of the liquid organic fuel from the anode side to the cathode side can be prevented by forming the hydrogen selective permeable film in the electrolyte membrane constituting the MEA.

In this embodiment, the electrode area of the unit cell is 0.01 cm$^2$, and a methanol aqueous solution (concentration: 40 wt %) is supplied as the liquid organic fuel through the openings formed on the substrate. The second catalyst electrode serving as the cathode is not particularly provided with a gas flow channel member or the like and is opened to the atmosphere so that air can be supplied thereto. When operated at 75° C., this thin film fuel cell can yield an output per cell of 0.01 to 0.05 W/cm$^2$. Further, the fuel cell is operable at room temperature and capable of yielding an output which is one-third to one-tenth of that obtained in the operation at 75° C.

Embodiment 8

After operating a polymer electrolyte thin film fuel cell as described above for a certain period of time, or when a predetermined output decrease is observed in the fuel cell, the step of filing an acid solution in a gas flow channel or a liquid organic fuel supply channel is performed during the operation. This makes it possible to replace impurity ions trapped in the hydrogen ion conductive polymer electrolyte membrane, thereby concurrently removing the impurity ions from the fuel cell. For example, in order to remove cations attributed to water, such as those of Na, Ca or the like, or metal ions such as ions of Fe, Cr, Ni or the like, the hydrogen ion conductive polymer electrolyte membrane may be regenerated by a treatment with an acid such as HNO$_3$.

Embodiment 9

Figure 9:
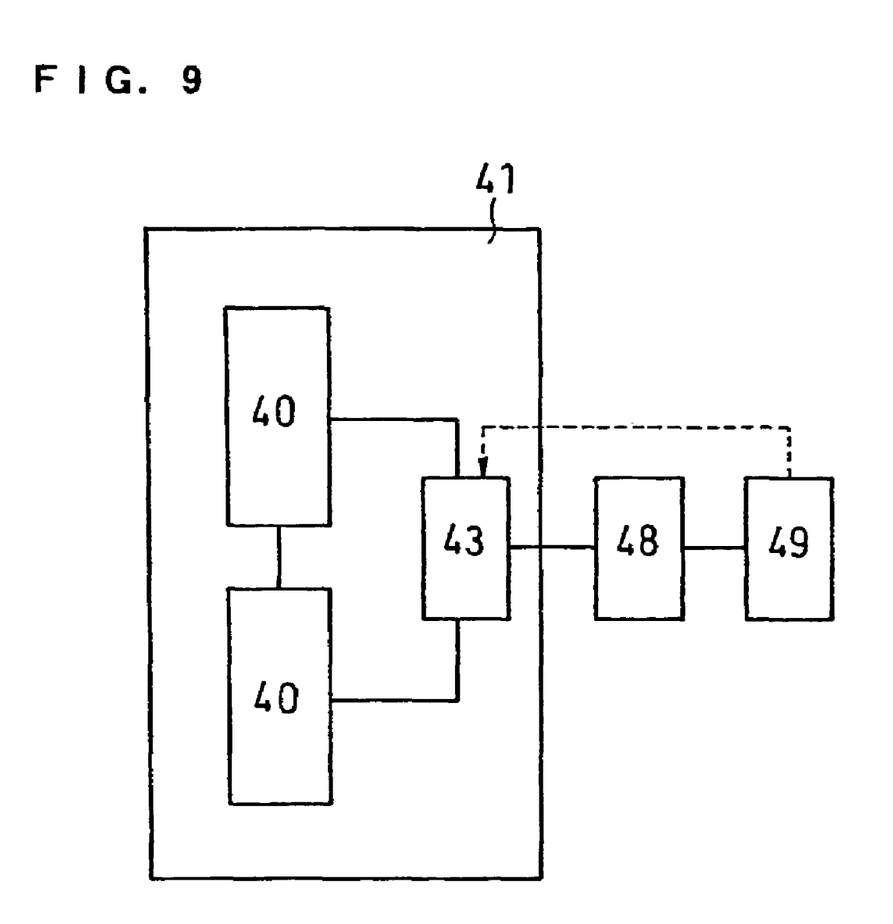
FIG. 9 is a block diagram of a fuel cell of Embodiment 9 in accordance with the present invention.

FIG. 9 shows a fuel cell comprising switching means capable of switching the connection of a plurality of cell blocks each containing a single or plurality of the electrolyte membrane-electrode assemblies described above, in series or parallel.

A substrate 41 is provided with two sets of cell blocks 40 each containing a single or plurality of electrolyte membrane-electrode assemblies. In general, each cell block comprises a plurality of electrolyte membrane-electrode assemblies connected in series or parallel; however, it may also comprise a single electrolyte membrane-electrode assembly. The two sets of the cell blocks and switching means 43 for switching the connection thereof constitute a power source unit. To the power source unit, voltage detecting means 48 and controlling means 49 are connected. The controlling means 49 controls the switching means 43 to connect the cell blocks 40 in series when a voltage detected by the voltage detecting means 48 is lower than a predetermined value, and to connect the cell blocks in parallel when the detected voltage is higher than a predetermined value.

At the time of driving a device, the output of the cell may sometimes be input to the device through a DC—DC converter, in order to supply stable voltage and output to the device. This is the case particularly for many of electronic devices capable of being driven by portable power sources. For this reason, these devices are designed to tolerate some variation in input voltage. However, when the output voltage of the cell is outside the input voltage range of the DC—DC converter, the conversion efficiency of the DC—DC converter is significantly reduced, or furthermore, it becomes impossible to drive the device. Therefore, when the output voltage of the fuel cell is outside the operating voltage range of the device, or the input voltage range of the DC—DC converter, the connection of the cells in the power source unit is switched from parallel to series, or from series to parallel, to temporarily raise or lower the output voltage of the power source unit, thereby making it possible to drive the device. The present invention provides a fuel cell capable of driving a device even at low output, for example, immediately after start-up.

In normal operation of the fuel cell, the plurality of cell blocks 40 shown in the figure is connected in parallel. In this case, at low output such as at the time of start-up, the controlling means 49 operates the switching means 43 to switch the connection of the cell blocks 40 from parallel to series when a voltage detected by the voltage detecting means 48 is lower than a preset value $V_1$. This increases the output voltage of the power source unit, so that the fuel cell can drive a device even at low output. Therefore, in the controlling means 49, a reference voltage value, with which a voltage detected by the voltage detecting means 48 is compared, is preferably in the vicinity of the input voltage of the device to be driven or that of the lower-limit input value of the DC—DC converter included with the device to be driven.

While the fuel cell drives a device, when the output characteristics are improved due to an increase in cell temperature and the like and thus the voltage of the power source unit has sufficiently increased to drive the device by the cell blocks connected in parallel, the controlling means 49 determines that the voltage is higher than a preset value $V_2$. Accordingly, the controlling means operates the switching means 43 to connect the cell blocks in parallel, returning to normal operation. Another reference voltage value used as a criterion in the controlling means 49 is a voltage capable of driving the device even in parallel connection, that is, a value obtained by multiplying the number of switchable connections by $V_1$.

In this embodiment, although the output voltage to be supplied to the load is increased when the output of the fuel cell is decreased as compared with that in normal operation, the opposite is also possible. More specifically, this is a case where the power consumption of the device is significantly decreased as compared with that in normal operation, in particular, a case where the output voltage of the fuel cell exceeds the upper-limit input voltage value of the DC—DC converter when the fuel cell is nearly in an open circuit condition. This can be avoided by switching the connection of the fuel cell from series to parallel to lower the output voltage of the fuel cell.

Embodiment 10

Figure 10:
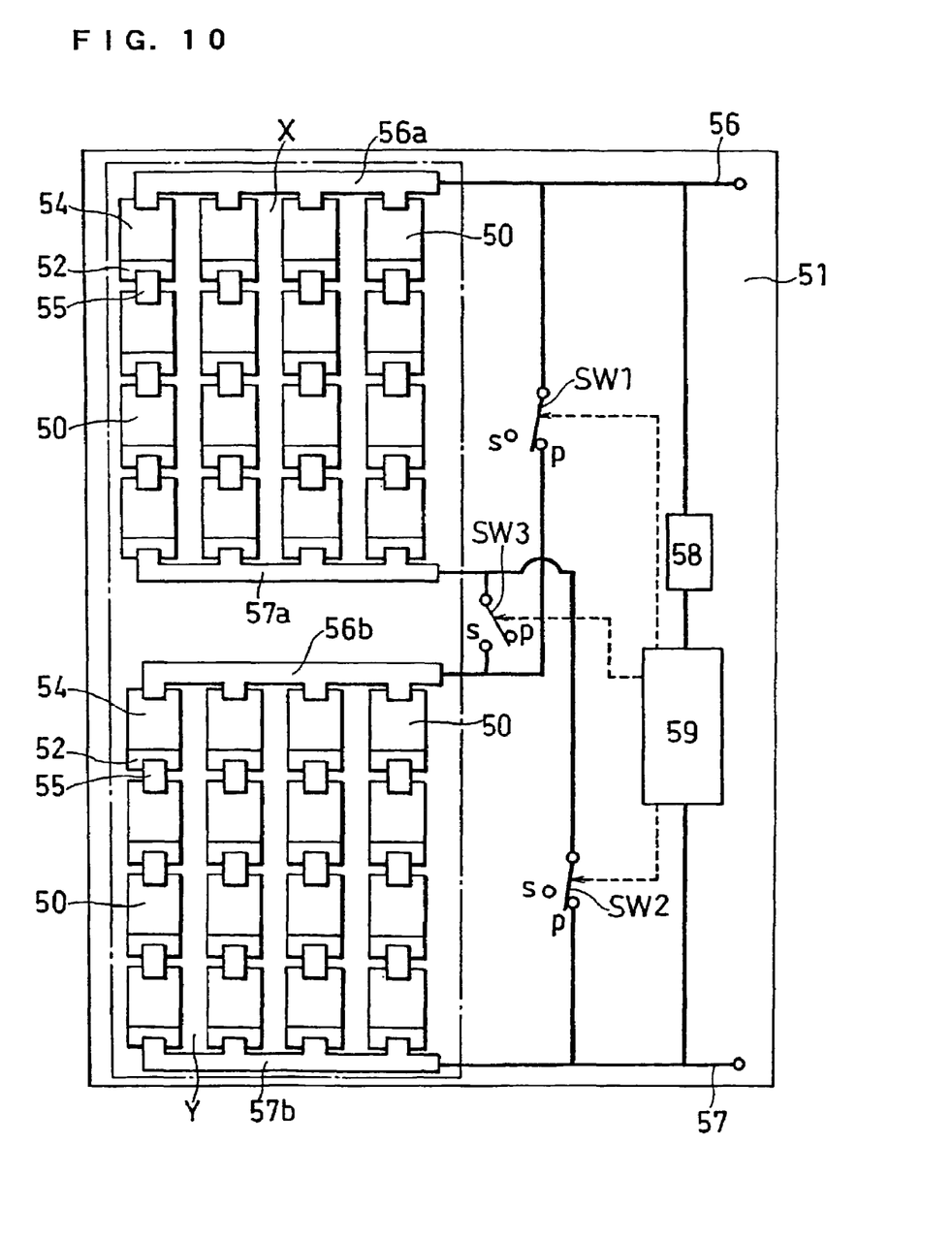
FIG. 10 is a diagram showing a connection of cell blocks in a fuel cell of Embodiment 10 in accordance with the present invention.

FIG. 10 shows a more specific embodiment.

A plurality of electrolyte membrane-electrode assemblies (MEAs) 50 is formed on a substrate 51 in the same manner as in Embodiment 1. In this embodiment, cell blocks X and Y each containing a plurality of MEAs are formed. In each cell block, four MEAs 50 are connected in series, and four sets of these are connected in parallel. A first catalyst electrode layer 52 serving as the anode of the MEA 50 is connected in series with a second catalyst electrode layer 54 serving as the cathode of the adjacent MEA, by a connector 55. The four cell rows thus connected in series are connected in parallel by connectors 56*a* and 57*a* or by connectors 56*b* and 57*b*.

The positive and negative terminals of the cell blocks X and Y are connected to output terminals 56 and 57 by a connecting circuit including selector switches SW1, SW2 and SW3. Between the terminals 56 and 57, voltage detecting means 58 and controlling means 59 are connected. The controlling means 59 connects the selector switches SW1, SW2 and SW3 to the contact point "s" side when a voltage detected by the voltage detecting means 58 is less than a predetermined value, and to the contact point "p" side when the voltage is a predetermined value or higher. In this manner, the cell blocks A and B are connected in series or parallel.

EXAMPLE 1

While two pieces of the fuel cells described in Embodiment 1 were held at 75° C., a hydrogen gas heated and humidified to have a dew point of 50° C. and air at room temperature were supplied to the anodes and cathodes, respectively, and the cells were continuously operated at a fuel utilization rate of 30%, an air utilization rate of 10% and a current density of 0.1 A/cm$^2$. One of the fuel cells (Cell A) was continuously operated for 2000 hours. The other fuel cell (Cell B) was operated for 1000 hours, and thereupon, a 0.1 M nitric acid aqueous solution was circulated in the fuel gas flow channel of the fuel cell for one hour with a pump, followed by washing with water. The changes in output of these fuel cells are shown in TABLE 1. The output with respect to the initial output was improved to 70% by the acid solution treatment performed after 1000 hours of operation. This was presumably because impurity ions were removed from the polymer electrolyte membrane by the acid treatment.

TABLE 1

|  | 0 hr | 1000 hr | 2000 hr |
| --- | --- | --- | --- |
| Cell A | 50 mW/cm$^2$ | 40 mW/cm$^2$ | 30 mW/cm$^2$ |
| Cell B | 50 mW/cm$^2$ | 40 mW/cm$^2$ | 36 mW/cm$^2$ |

After 2000 hours of operation, analysis was made on the substitution rates with ions of Fe, Ca and Na at the ion exchange site in the polymer electrolyte membrane. The results are shown in TABLE 2. In the case of Cell B, which was treated with acid in the middle of the operation, the substitution rates were reliably decreased.

TABLE 2

|  | Cell A | Cell B |
| --- | --- | --- |
| $Fe^{3+}$ | 0.8% | 0.1% |
| $Ca^{2+}$ | 0.15% | 0.03% |
| $Na^+$ | 0.11% | 0.02% |

The above-described operation method enabled removal of impurity ions in the fuel cell without disassembly of the fuel cell. This resulted in a simplified maintenance and thus was effective.

EXAMPLE 2

Four pieces of the unit cells described in Embodiment 1, having an electrode area of 0.01 cm$^2$, were connected in series, and four sets of these were connected in parallel to produce cell blocks X and Y.

A power source unit in which the cell blocks X and Y were simply connected in parallel was operated first. A device having a voltage of 12 V and a power consumption of 6 mW was used as the device to be driven by this power source unit, and a DC—DC converter having an input of 3 V to 7 V and an output of 12 V was used. A humidified hydrogen gas and air were supplied as a fuel and an oxidant gas, respectively, to the power source unit; as a result, an open circuit voltage of 0.91 V was obtained at a cell temperature of 75° C. The device was driven when the power source unit was connected to the device and the DC—DC converter. The output of the fuel cell at this time was 6.4 mW (3.2 V-2.0 mA).

Meanwhile, the above-described fuel cell was allowed to stand for one week after power generation. Thereafter, when an attempt was made to drive the device at room temperature by supplying a humidified hydrogen gas and air as a fuel and an oxidant, respectively, the device was not driven. The output of the power source unit at this time was 6.4 mW (1.6 V-4.0 mA). It was considered that the device was not driven because the output voltage of the fuel cell was below the input voltage range of the DC—DC converter. However, the output gradually increased with time, and after about five minutes, the device became operable. The output at this time was 6.3 mW (3.0 V-2.1 mA). This was presumably either because the polymer electrolyte was gradually humidified by the continuous supply of a humidified hydrogen gas thereby to reduce the resistance in the electrolyte, or because the cell temperature increased.

Next, a fuel cell having a configuration as shown in FIG. 10 was tested. Herein, the voltage $V_1$ at which the switches SW1, SW2 and SW3 were turned from the contact point "p" side to the "s" side was set at 3 V, and the voltage $V_2$ at which the switches were turned from the contact point "s" side to the "p" side was set at 6 V.

After allowing the fuel cell to stand for one week after power generation, when a similar attempt was made to drive a device at room temperature by supplying a humidified hydrogen gas and air as a fuel and an oxidant, respectively, the device was able to be driven instantaneously. At this time, the cell blocks in the power source unit were in serial connection, and the output thereof was 6.4 mW (3.2 V-2.0 mA). Four minutes after starting to drive the device, the connection of the cell blocks was switched from series to parallel, returning to normal operation. In other words, at normal operation in which no switching of the connection was performed at all, it was impossible to drive the device immediately after start-up of the fuel cell and it took five minutes to drive the device. In contrast, when the fuel cell was provided with series-parallel switching means, it became possible to drive the device instantaneously, even immediately after start-up of the fuel cell.

In this example, series-parallel switching was performed for two cell blocks; however, the number of cell blocks for which the switching is performed is not limited to two, and the switching may be performed for three or more plural cell blocks. In addition, although the cell blocks were formed on a same substrate in this example, a similar result can be achieved when they are formed on different substrates.

INDUSTRIAL APPLICABILITY

As described above, the present invention enables a very small fuel cell and the integration of the cells, by using a semiconductor process. Moreover, the polymer electrolyte thin film fuel cell of the present invention has excellent hydrogen ion conductivity, because it employs a hydrogen ion conductive polymer electrolyte membrane having an extremely small thickness. Therefore, the present invention is also effective in that the characteristics of the fuel cell can be improved. Furthermore, according to the present invention, it is possible to drive a device stably without a great influence by the operation environment such as a cell temperature, outside air temperature and humidity. In particular, a starting-time can be significantly shortened at the time of start-up. The impurities contained in the hydrogen ion conductive polymer electrolyte membrane can be removed by treatment with an acid such as nitric acid. Consequently, the fuel cell can be stably operated for a long time.

The invention claimed is:

1. A polymer electrolyte thin film fuel cell comprising:
   a substrate having at least one through-hole;
   an electrolyte membrane-electrode assembly formed on said substrate so as to cover said at least one through-hole, said assembly comprising a first catalyst electrode layer, a hydrogen ion conductive polymer electrolyte membrane and a second catalyst electrode layer which are formed successively; and
   fuel and oxidant supply means for supplying a fuel or an oxidant gas to said first catalyst electrode layer through said at least one through-hole, and an oxidant gas or a fuel to said second catalyst electrode layer,
   wherein said at least one through-hole is aligned such that the through-hole overlaps with said electrolyte membrane-electrode assembly.

2. The polymer electrolyte fuel cell in accordance with claim 1, wherein said electrolyte membrane-electrode assembly is connected in series or parallel.

3. The polymer electrolyte thin film fuel cell in accordance with claim 2, further comprising a second substrate which comprises a second through-hole and a second electrolyte membrane-electrode assembly formed so as to cover said second through-hole, said second assembly comprising a third catalyst electrode layer, a second hydrogen ion conductive polymer electrolyte membrane and a fourth catalyst electrode layer which are formed successively, said second assembly being connected in series or parallel,
   wherein said second substrate and said substrate are bonded together with back surfaces thereof facing each other, and
   an oxidant gas or fuel gas flow channel linking said at least one through-hole and said second through-hole is formed between said substrates.

4. The polymer electrolyte thin film fuel cell in accordance with claim 1, wherein said first catalyst electrode layer and second catalyst electrode layer are porous.

5. The polymer electrolyte thin film fuel cell in accordance with claim 1,
   wherein a hydrogen selective permeable film is laminated on a surface of a catalyst electrode layer to which a fuel is supplied.

6. The polymer electrolyte thin film fuel cell in accordance with claim 1,
   wherein said electrolyte membrane constituting said electrolyte membrane-electrode assembly comprises a laminate of a hydrogen ion conductive polymer electrolyte membrane and a water retaining material film.

7. The polymer electrolyte thin film fuel cell in accordance with claim 1,
   wherein said electrolyte membrane constituting said electrolyte membrane-electrode assembly comprises a laminate of a hydrogen ion conductive polymer electrolyte membrane and an anti-crossover film.

8. The polymer electrolyte thin film fuel cell in accordance with claim 5,
   wherein said electrolyte membrane constituting said electrolyte membrane-electrode assembly comprises a laminate of a hydrogen ion conductive polymer electrolyte membrane and a hydrogen selective permeable film, and said fuel cell further comprises fuel supply means for supplying, through said through-hole of said substrate, a liquid organic fuel to said first electrode catalyst layer.

9. The polymer electrolyte thin film fuel cell in accordance with claim 1, further comprising:
   a plurality of cell blocks each containing a single or plurality of electrolyte membrane-electrode assemblies;
   connecting means for connecting said cell blocks in series or parallel; and
   controlling means for controlling said connecting means to switch said cell blocks from series to parallel, or from parallel to series.

10. The polymer electrolyte thin film fuel cell in accordance with claim 1, further comprising:
    at least two sets of cell blocks each containing a single or plurality of electrolyte membrane-electrode assemblies;
    connecting means for connecting said cell blocks in series or parallel;
    voltage detecting means for detecting an output voltage of said cell blocks; and
    controlling means for controlling said connecting means to connect said cell blocks in series when a voltage detected by said voltage detecting means is lower than a predetermined value and for controlling said connecting means to connect said cell blocks in parallel when said voltage is higher than a predetermined value.

11. A method of manufacturing a polymer electrolyte thin film fuel cell, said method comprising the steps of:
    successively forming on a substrate, a first catalyst electrode layer, a hydrogen ion conductive polymer electrolyte membrane and a second catalyst electrode layer, thereby producing an electrolyte membrane-electrode assembly; and
    forming on a back surface of said substrate at a portion thereof corresponding to said electrolyte membrane-electrode assembly, a through-hole for exposing said first catalyst electrode layer, wherein said through-hole is aligned such that the through-hole overlaps with said electrolyte membrane-electrode assembly.

12. The method of manufacturing a polymer electrolyte thin film fuel cell in accordance with claim 11,
    wherein said first or second catalyst electrode layer is formed from an alloy of a metal having catalytic action and a metal having no catalytic action, followed by removing said metal having no catalytic action from said first or second catalyst electrode layer in said step of forming said through-hole, thereby making said first or second catalyst electrode layer porous.

13. A method of operating a polymer electrolyte thin film fuel cell comprising the step of filling an acid solution in a gas flow channel or liquid organic fuel channel to replace a cation impurity trapped in a hydrogen ion conductive polymer electrolyte membrane, when a predetermined output decrease is observed in the fuel cell, thereby removing said impurity from the fuel cell.

14. The polymer electrolyte fuel cell in accordance with claim 1,
    wherein said electrolyte membrane-electrode assembly is formed on a front surface of said substrate, and
    wherein said at least one through-hole extends from a back surface of said substrate to said front surface.

15. The polymer electrolyte fuel cell in accordance with claim 14,
    wherein said at least one through-hole narrows from the back surface of said substrate to said front surface.

16. The method of manufacturing a polymer electrolyte thin film fuel cell in accordance with claim 11,
wherein said electrolyte membrane-electrode assembly is formed on a front surface of said substrate, and
wherein said through-hole extends from the back surface of said substrate to said front surface.

17. The method of manufacturing a polymer electrolyte thin film fuel cell in accordance with claim 16,
wherein said through-hole narrows from the back surface of said substrate to said front surface.

18. The method of operating a polymer electrolyte thin film fuel cell in accordance with claim 13, wherein said polymer electrolyte thin film fuel cell comprises:
a substrate having a plurality of through-holes;
an electrolyte membrane-electrode assembly formed on said substrate so as to cover each of said through-holes, said assembly comprising a first catalyst electrode layer, a hydrogen ion conductive polymer electrolyte membrane and a second catalyst electrode layer which are formed successively; and
fuel and oxidant supply means for supplying a fuel or an oxidant gas to said first catalyst electrode layer through said through-holes, and an oxidant gas or a fuel to said second catalyst electrode layer.

19. A method of manufacturing a polymer electrolyte thin film fuel cell, said method comprising the steps of:
successively forming on a substrate, a first catalyst electrode layer, a hydrogen ion conductive polymer electrolyte membrane and a second catalyst electrode layer, thereby producing an electrolyte membrane-electrode assembly; and
forming on a back surface of said substrate at a portion thereof corresponding to said electrolyte membrane-electrode assembly, a through-hole for exposing said first catalyst electrode layer,
wherein said first or second catalyst electrode layer is formed from an alloy of a metal having catalytic action and a metal having no catalytic action, followed by removing said metal having no catalytic action from said first or second catalyst electrode layer in said step of forming said through-hole, thereby making said first or second catalyst electrode layer porous.

20. The polymer electrolyte thin film fuel cell in accordance with claim 2, further comprising a second substrate which comprises a second through-hole and a second electrolyte membrane-electrode assembly formed so as to cover said second through-hole, said second assembly comprising a third catalyst electrode layer, a second hydrogen ion conductive polymer electrolyte membrane and a fourth catalyst electrode layer which are formed successively, said second assembly being connected in series or parallel,
wherein said second substrate and said substrate are bonded together with back surfaces thereof facing each other, and
an oxidant gas or fuel gas flow channel linking said second through-hole and said at least one through-hole is formed between said substrates.

* * * * *